United States Patent
Zhu et al.

(10) Patent No.: US 11,761,491 B2
(45) Date of Patent: Sep. 19, 2023

(54) BALL-HINGED TRANSMISSION SHAFT WITH STRAIGHT SHAFT

(71) Applicant: QINGDAO ACME INNOVATION TECHNOLOGY CO., LTD., Qingdao (CN)

(72) Inventors: Dewei Zhu, Qingdao (CN); Xiaoyu Rong, Qingdao (CN); Rongren Cao, Qingdao (CN)

(73) Assignee: QINGDAO ACME INNOVATION TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 18/009,992

(22) PCT Filed: Aug. 2, 2021

(86) PCT No.: PCT/CN2021/109954
§ 371 (c)(1),
(2) Date: Dec. 13, 2022

(87) PCT Pub. No.: WO2022/037399
PCT Pub. Date: Feb. 24, 2022

(65) Prior Publication Data
US 2023/0213069 A1    Jul. 6, 2023

(30) Foreign Application Priority Data
Aug. 20, 2020    (CN) .......................... 202021793026.3

(51) Int. Cl.
*F16D 3/44*    (2006.01)
(52) U.S. Cl.
CPC ..................................... *F16D 3/44* (2013.01)

(58) Field of Classification Search
CPC . F16C 17/105; F16D 3/16; F16D 3/20; F16D 3/26; F16D 3/38; F16D 3/44; Y10S 464/905
(Continued)

(56) References Cited

U.S. PATENT DOCUMENTS 2,305,594 A * 12/1942 Backus ................... F16D 3/265
                                                       464/110
2,709,901 A *  6/1955 Forsythe ................... F16D 3/44
                                                       464/123

(Continued)

FOREIGN PATENT DOCUMENTS

| CN | 102518689 A | 6/2012 |
|---|---|---|
| CN | 202360621 U | 8/2012 |

(Continued)

*Primary Examiner* — Josh Skroupa
(74) *Attorney, Agent, or Firm* — Bayramoglu Law Offices LLC

(57) ABSTRACT

A ball-hinged transmission shaft with a straight shaft includes a socket, a ball, and a straight shaft. A rolling element is further coaxially provided on a straight shaft. The rolling element is a rotator with an axis of the straight shaft as a center of rotation. An upper portion of the rolling element is connected to a bearing. A mouth-shaped surface is further respectively provided at two ends of a transmission hole of a ball. The mouth-shaped surface is a curved surface matching the shape of the rolling element. The rolling element is fit and provided in the mouth-shaped surface at the two ends of the transmission hole of the ball. The ball is restricted by an inner positioning spherical surface of a socket, the straight shaft, and the rolling element at the same time.

18 Claims, 7 Drawing Sheets

(58) Field of Classification Search
USPC .................. 464/112, 128, 129, 130, 905
See application file for complete search history.

(56) References Cited

U.S. PATENT DOCUMENTS

| | | | | |
|---|---|---|---|---|
| 3,439,962 | A * | 4/1969 | Gothberg | F16C 17/18 |
| | | | | 384/107 |
| 3,609,994 | A * | 10/1971 | Colletti | F16D 3/2052 |
| | | | | 464/122 |
| 4,114,401 | A * | 9/1978 | Van Hoose | F16D 3/2052 |
| | | | | 464/120 |
| 4,151,728 | A | 5/1979 | Kimball | |
| 8,104,382 | B2 * | 1/2012 | Hu | B25B 23/0035 |
| | | | | 81/177.85 |
| 9,664,237 | B2 * | 5/2017 | Bodtker | F16D 3/38 |
| 11,629,760 | B2 * | 4/2023 | Lock | F16D 3/24 |
| | | | | 464/142 |
| 2015/0094157 | A1 * | 4/2015 | Lock | F16D 3/30 |
| | | | | 464/147 |
| 2019/0293112 | A1 * | 9/2019 | Tsai | F16C 11/0647 |

FOREIGN PATENT DOCUMENTS

| | | | | |
|---|---|---|---|---|
| CN | 107605980 | A | 1/2018 | |
| CN | 207333486 | U | 5/2018 | |
| CN | 213176523 | U | 5/2021 | |
| DE | 19843333 | A1 | 6/2000 | |
| EP | 0048564 | A2 | 3/1982 | |
| FR | 355120 | A * | 10/1905 | ............... F16D 3/44 |
| FR | 2211077 | A5 * | 7/1974 | ............... F16D 3/44 |
| GB | 458006 | A * | 12/1936 | ............... F16D 3/44 |
| GB | 2094440 | A * | 9/1982 | ............... F16D 3/38 |

* cited by examiner

BALL-HINGED TRANSMISSION SHAFT WITH STRAIGHT SHAFT

CROSS REFERENCES TO THE RELATED APPLICATIONS

The application is the national phase entry of International Application No. PCT/CN2021/109954, filed on Aug. 2, 2021, which is based on and claims priority to Chinese patent application No. 202021793026.3, filed on Aug. 20, 2020, the entire contents of which are incorporated herein by reference.

TECHNICAL FIELD

The present disclosure relates to the field of mechanical equipment, in particular, to a ball-hinged transmission shaft with a straight shaft.

BACKGROUND

The present disclosure is deemed as a further optimization and improvement on the Chinese Patent Application No. CN 201710956327.X (filed on Oct. 16, 2017, with publication No. CN 107605980 A) and the Chinese Patent Application No. CN 201721322884.8 (filed on Oct. 16, 2017, with publication No. CN 207333486 U). According to the above-mentioned patented technologies, the large contact stress between a straight shaft and a transmission hole during transmission is distributed unreasonably and is mainly concentrated at the mouth of the transmission hole, resulting in the mouth of the transmission hole being abraded quickly to affect the service life of the product. Further, when the cylindrical straight shaft rolls on the surface of the transmission hole, the contact generatrix of the cylindrical straight shaft slides largely relative to the contact surface of the transmission hole, which accelerates abrasion of the contact surface to shorten the service life of the product. The present disclosure is intended to overcome the above shortages to prolong the service life of the product.

SUMMARY

The main objective of the present disclosure is to provide a ball-hinged transmission shaft with a straight shaft to solve the problem that the large contact stress between a straight shaft and a transmission hole is distributed unreasonably to abrade the mouth of the transmission hole quickly to affect the service life of the product in the prior art.

To achieve the above objective, the present disclosure adopts the following technical solutions:

A ball-hinged transmission shaft with a straight shaft includes a socket, a ball, and a straight shaft. An outer spherical surface of the ball is positioned and limited in an inner positioning spherical surface of the socket to form a sliding fit pair. A transmission hole is formed in the ball. After passing through the transmission hole of the ball, the straight shaft is hinged into a bearing hole of the socket through a bearing. A rolling element is further coaxially provided on the straight shaft. The rolling element is a rotator with an axis of the straight shaft as the center of rotation. The rolling element is externally connected to the bearing. The mouth-shaped surface is further respectively provided at two ends of the transmission hole of the ball. The mouth-shaped surface is a curved surface matching the shape of the rolling element. The rolling element is fit and provided in the mouth-shaped surface at the two ends of the transmission hole of the ball. The ball is restricted by the inner positioning spherical surface of the socket, the straight shaft, and the rolling element at the same time. When a ball handle of the ball swings around the center of the inner positioning spherical surface of the socket, the rolling element may rotate around the axis of the straight shaft, while rolling along the mouth-shaped surface of the transmission hole, thereby transmitting a power and a rotational speed between the ball and the socket in a state where a certain included angle is formed between the axis of the ball handle and the axis of the socket.

Further, the outer surface of the rolling element matching the mouth-shaped surface is a tapered surface, and a contact generatrix between the tapered surface and the mouth-shaped surface is a straight line.

Further, an extended line of the contact generatrix passes through the center of the inner spherical surface of the socket.

Further, an outer surface of the rolling element matching the mouth-shaped surface is a revolution curved surface, and a contact generatrix between the revolution curved surface and the mouth-shaped surface is a curved line.

Further, the contact generatrix is an arc, a hyperbolic curve, or an involute.

Further, the bearing is a tapered roller bearing (TRB).

Further, the bearing is a TRB, and the rolling element and an inner ring of the bearing are of an integral structure.

Further, the socket is of an integral or split structure.

Further, two fit pairs of ball and socket are paired for use. Two sockets are respectively arranged at two ends of a transmission shaft assembly. The transmission shaft includes a spline shaft and a spline housing, and the transmission shaft is stretched and retracted through cooperation between the spline shaft and the spline housing.

Further, two sockets are connected oppositely and symmetrically and integrated for use.

The present disclosure has the following beneficial effects:

(1) With the rolling element and the mouth-shaped surface of the transmission hole, the present disclosure improves the stress state of the transmission hole, reduces stress concentration, and prolongs the service life of the product.

(2) The outer surface of the rolling element matching the mouth-shaped surface of the transmission hole is the tapered surface or the revolution curved surface, which increases contact and stressed areas in transmission and reduces contact stress in the transmission.

(3) The present disclosure reduces or eliminates a relative slip between the rolling element and the mouth-shaped contact surface of the transmission hole during transmission of the straight shaft, minimizes loss due to sliding friction, and decreases the sliding abrasion of the contact surface.

(4) The maintenance is convenient. After the rolling element is abraded, only the rolling element, rather than the straight shaft, is replaced to save the maintenance cost.

In the figures: Q: ball, Q-1: transmission hole, Q-2: outer spherical surface of ball, Q-3: ball handle, Q-4: mouth-shaped surface, S: straight shaft, W: socket, W-1: inner positioning spherical surface, W-2: bearing hole, Z: bearing, M: rolling element, M-1: contact generatrix, G: dust cover, and C: transmission shaft.

DETAILED DESCRIPTION OF THE EMBODIMENTS

The present disclosure is further described below by referring to the accompanying drawings.

Embodiment 1

Figure 1:
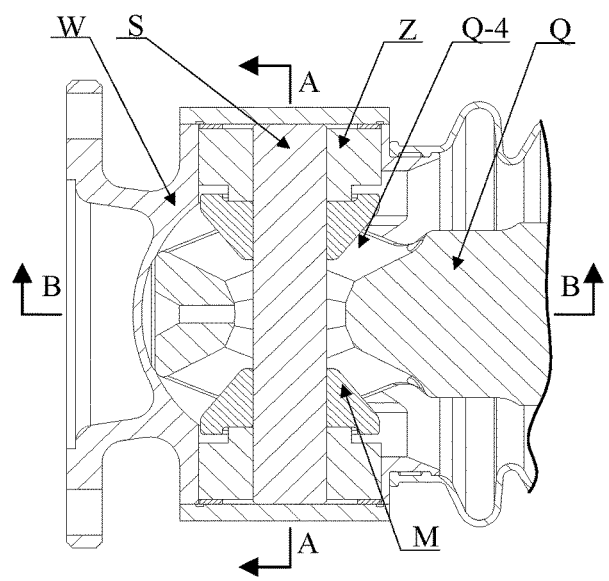
FIG. 1 is a schematic structural view according to Embodiment 1 of the present disclosure.
Figure 2:
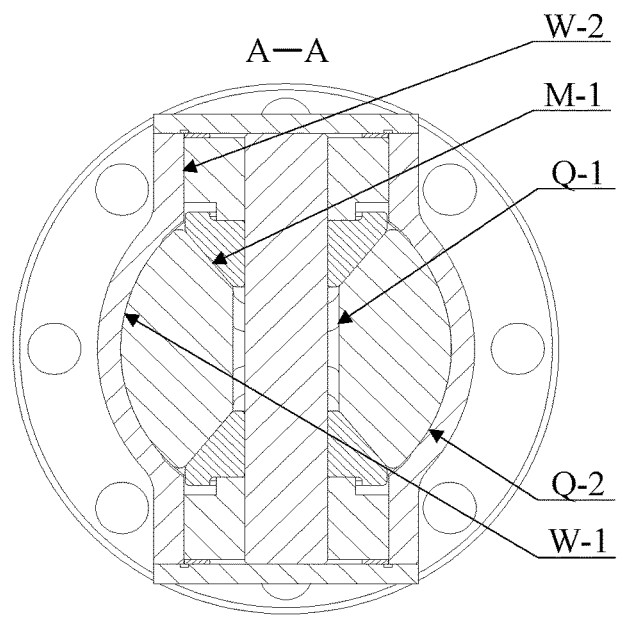
FIG. 2 is a sectional view along A-A in FIG. 1.

As shown in FIGS. 1-2, a ball-hinged transmission shaft with a straight shaft includes socket W, ball Q, and straight shaft S. Outer spherical surface Q-2 of the ball is positioned and limited in inner positioning spherical surface W-1 of the socket to form a sliding fit pair. Transmission hole Q-1 is formed in the ball. Mouth-shaped surface Q-4 is further respectively provided at two ends of the transmission hole, as shown in FIG. 1. Rolling element M is further coaxially provided on the straight shaft. The rolling element is a tapered element with an axis of the straight shaft as the center of rotation. The straight shaft passes through the transmission hole of the ball with two ends each hinged into bearing hole W-2 of the socket through bearing Z and limiting an axial position of the rolling element. An outer tapered surface of the rolling element matches the mouth-shaped surface at the two ends of the transmission hole of the ball. Contact generatrix M-1 between the rolling element and the mouth-shaped surface is a straight line with an extended line passing through the center of the ball.

Figure 15:
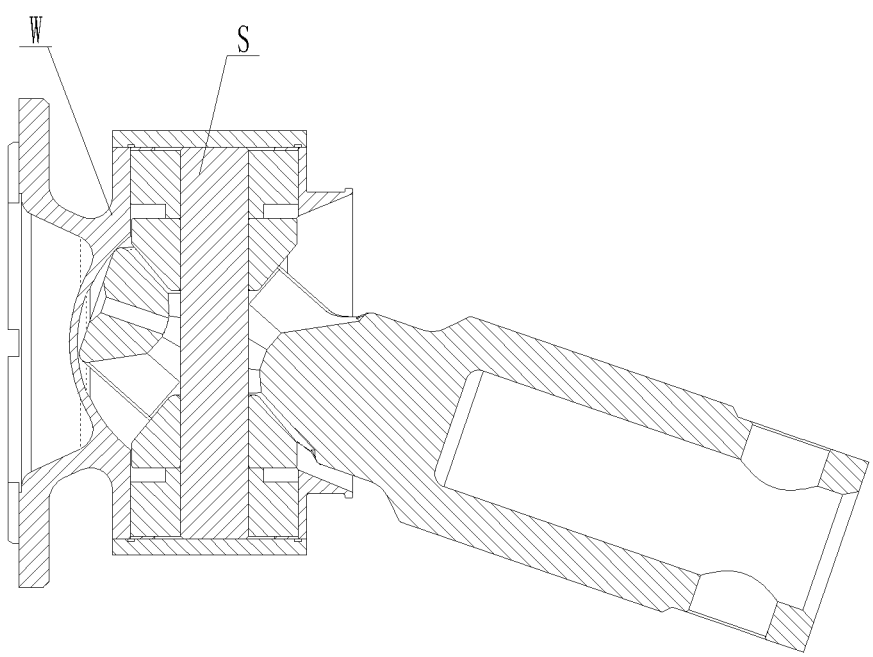
FIG. 15 is a schematic view illustrating a state that a ball of a transmission shaft rotates in a socket for a certain angle for transmission, where an included angle is formed between an axis of a ball handle and an axis of a socket.

As shown in FIG. 2, the ball Q is restricted by the inner positioning spherical surface W-1 of the socket, the straight shaft S, and the rolling element M at the same time. Ball handle Q-3 of the ball Q may swing around the center of the inner positioning spherical surface of the socket. The rolling element may rotate around the axis of the straight shaft, while rolling along the mouth-shaped surface of the transmission hole, thereby transmitting a power or a rotational speed between the ball and the socket in a state where a certain included angle is formed between an axis of the ball handle and an axis of the socket, as shown in FIG. 15.

In the embodiment, the rolling element is the tapered element, and the extended line of the contact generatrix between the rolling element and the mouth-shaped surface passes through the center of the ball. When the specific included angle is kept between the axis of the ball handle and the axis of the socket to transmit the power, the rolling element can keep rolling on the mouth-shaped surface, which reduces or prevents sliding friction between the rolling element and the mouth-shaped contact surface, reduces abrasion and heating of the mouth-shaped surface and the rolling element, and prolongs the service life of the product.

Embodiment 2

Figure 3:
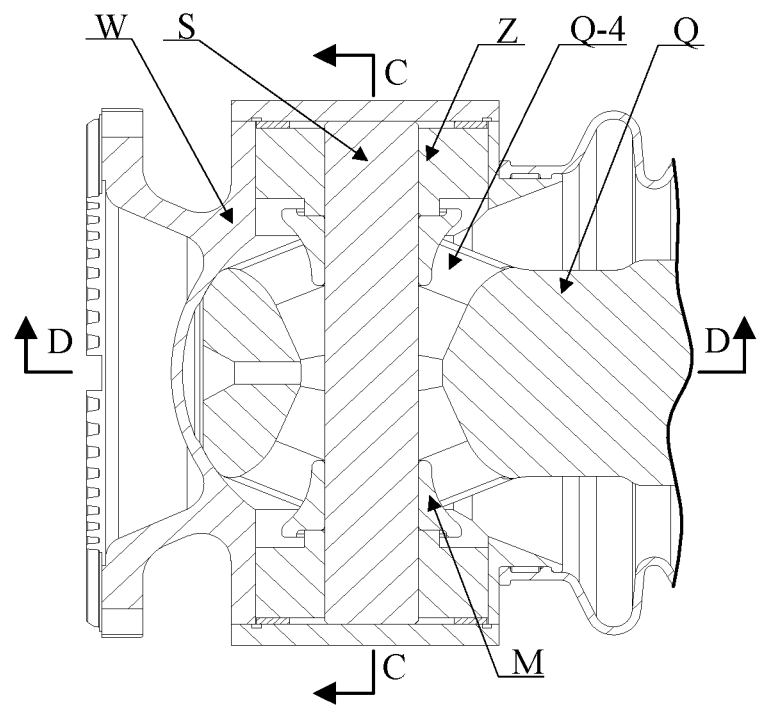
FIG. 3 is a schematic structural view according to Embodiment 2 of the present disclosure.
Figure 4:
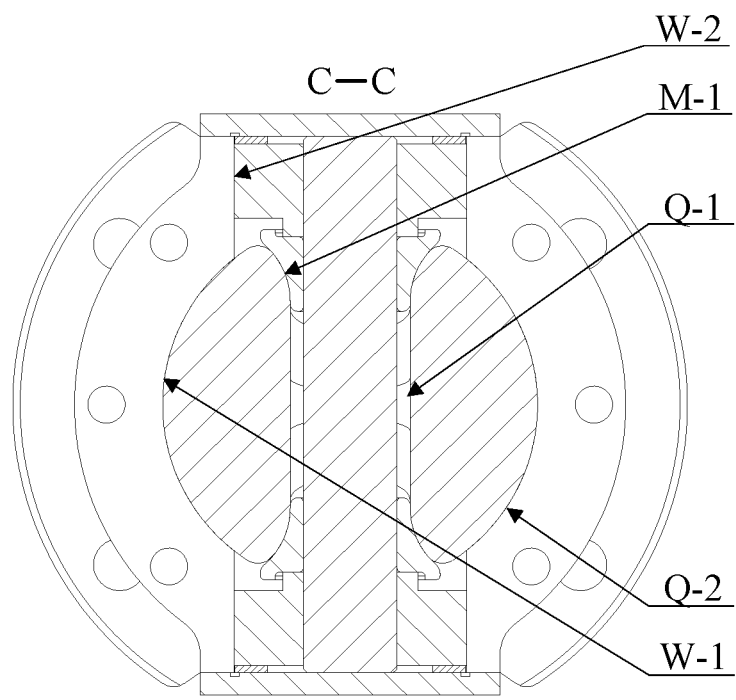
FIG. 4 is a sectional view along C-C in FIG. 3.

As shown in FIGS. 3-4, Embodiment 2 is a variation of Embodiment 1 with the following main differences: The rolling element has a different shape. In Embodiment 2, the outer surface of the rolling element matching the mouth-shaped surface of the transmission hole is a revolution curved surface, and a contact generatrix between the revolution curved surface and the mouth-shaped surface of the transmission hole is a curved line. The curved line may be an arc, a hyperbolic curve, an involute, and so on as required. In this way, the effective contact area between the rolling element and the mouth-shaped surface of the transmission hole of the ball in power transmission can be increased, the contact stress can be reduced, and the service life of the product can be prolonged.

Embodiment 3

Figure 5:
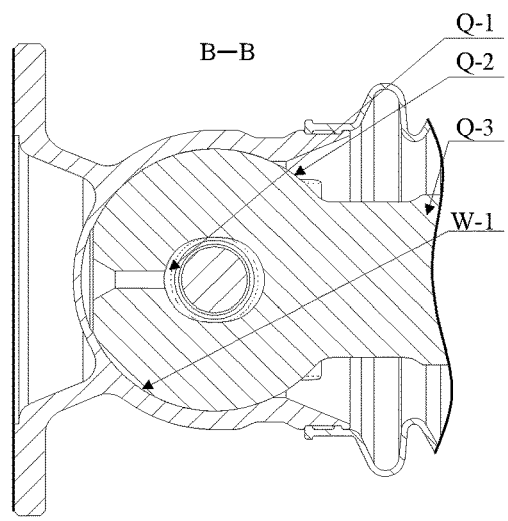
FIG. 5 is a sectional view along B-B in FIG. 1.
Figure 6:
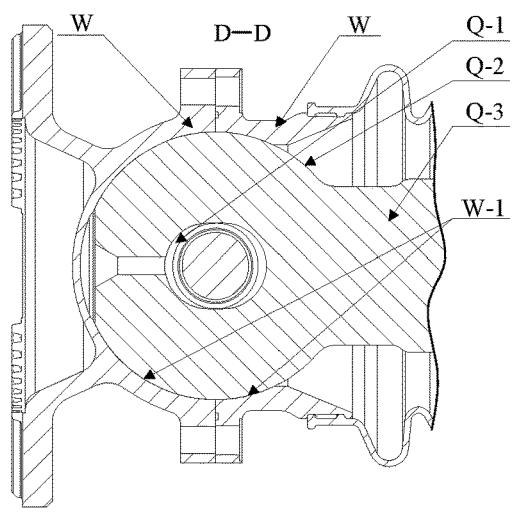
FIG. 6 is a sectional view along D-D in FIG. 3.
Figure 9:
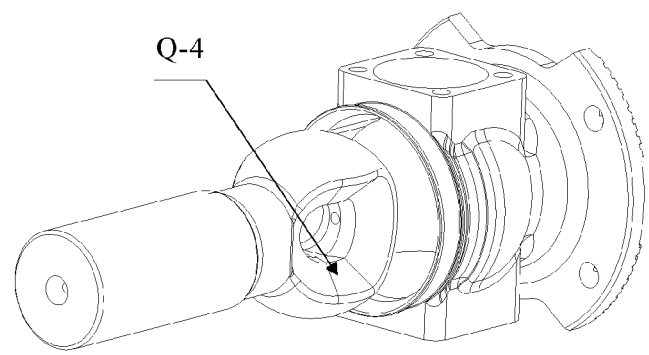
FIG. 9 is a perspective view of an integral ball-and-socket structure.
Figure 10:
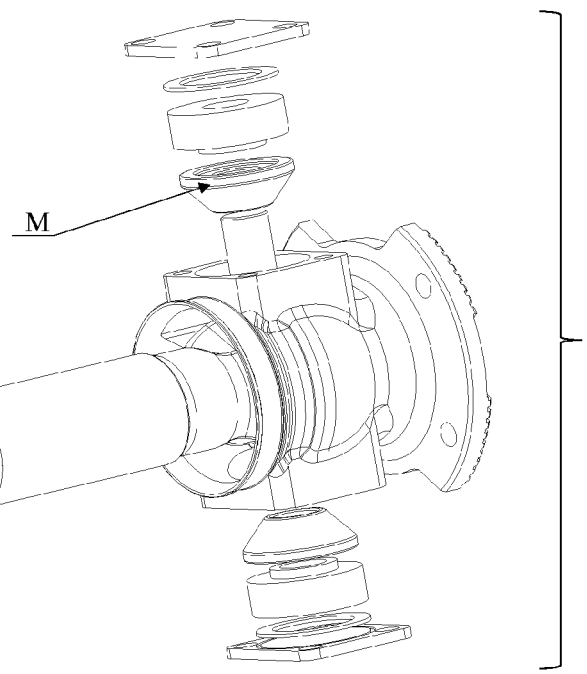
FIG. 10 is an exploded view of an integral ball-and-socket structure.
Figure 11:
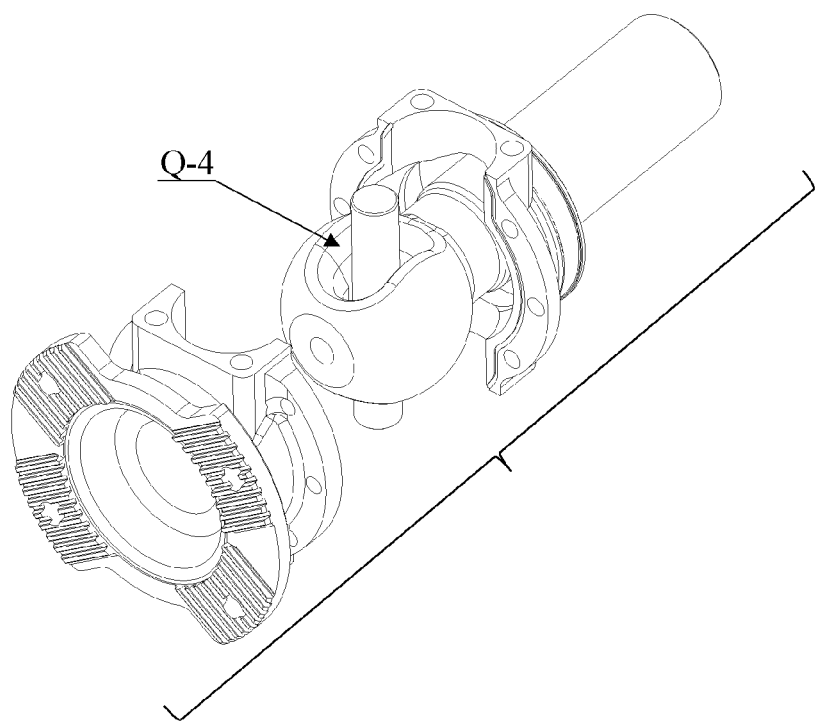
FIG. 11 is a perspective view of a split ball-and-socket structure.
Figure 12:
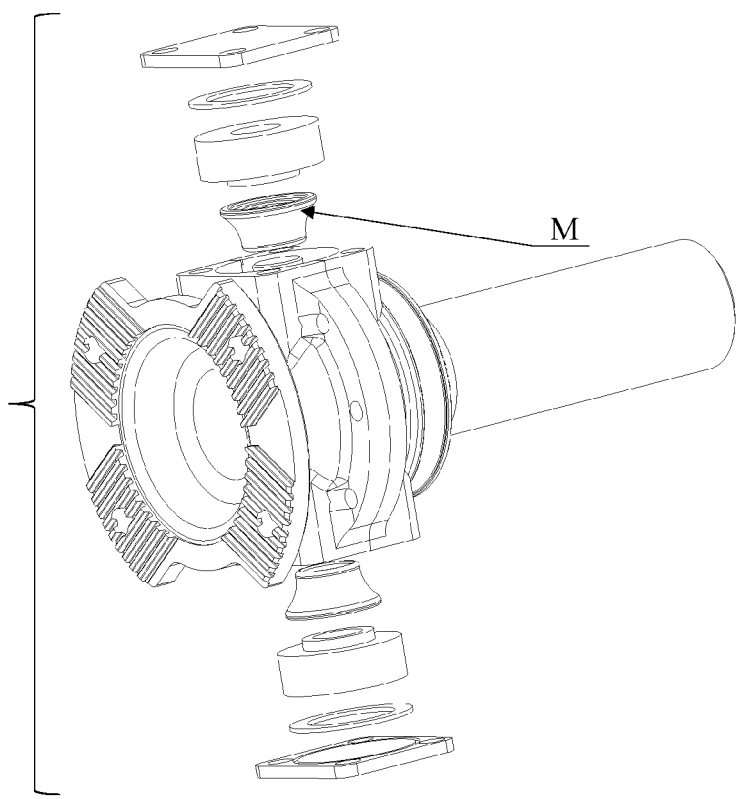
FIG. 12 is an exploded view of a split ball-and-socket structure.

As shown in FIG. 5, FIG. 6, and FIGS. 9-12, the socket may be of an integral structure or a split structure. FIG. 5, FIG. 9, and FIG. 10 show the integral structure, while FIG. 6, FIG. 11, and FIG. 12 show the split structure. Other descriptions are similar to the above and will not be repeated herein.

Embodiment 4

Figure 7:
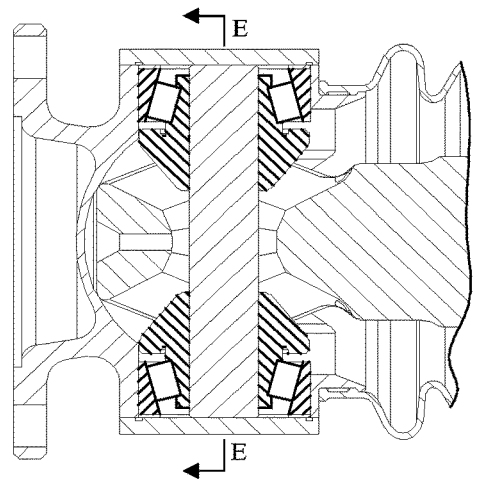
FIG. 7 is a schematic view illustrating an integral structure of a rolling element and an inner ring of a TRB in a split socket.
Figure 8:
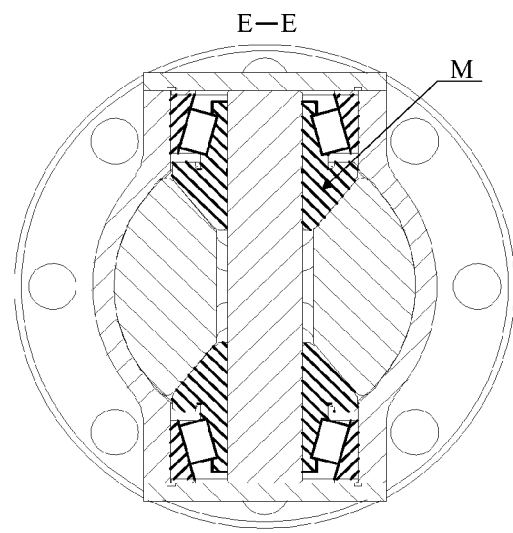
FIG. 8 is a schematic view illustrating an integral structure of a rolling element and an inner ring of a TRB in an integral socket.

As shown in FIG. 7 and FIG. 8, the bearing may be a TRB. The rolling element may be integrated with an inner ring of the TRB to use fewer components and achieve a simpler structure, a better quality and a lower cost. Other descriptions are similar to the above and will not be repeated herein.

Embodiment 5

Figure 13:
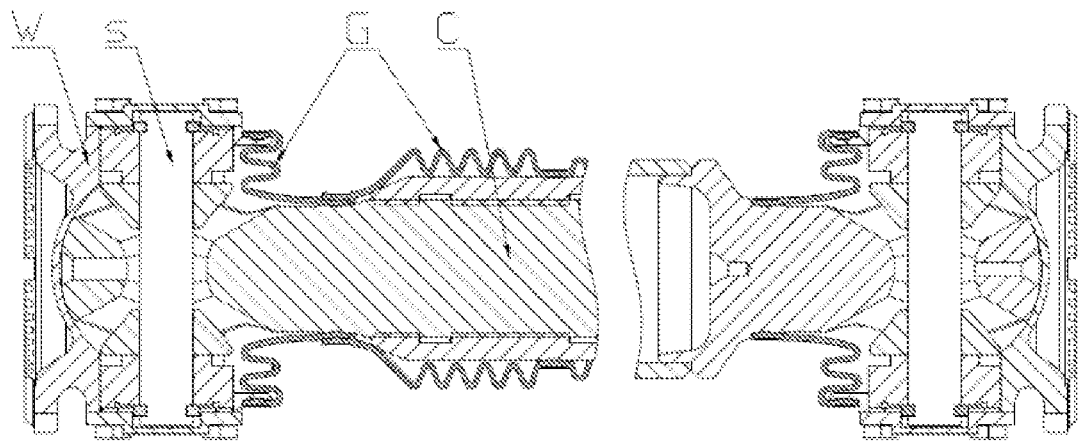
FIG. 13 is a schematic view illustrating that two fit pairs of ball and socket are paired for use, where a transmission shaft is stretched and retracted along a length direction.

FIG. 13 is a schematic view illustrating that two fit pairs of ball and socket are paired for use. Two sockets are respectively arranged at two ends of a transmission shaft C assembly. The transmission shaft may be stretched and retracted in the length direction through cooperation between a spline shaft and a spline housing to adapt to a mounting distance of the transmission shaft. Dust cover G is sleeved on the spline shaft and the spline housing and configured to prevent dust and seal a lubricant. Certainly, the extension or retraction of the transmission shaft may also be realized in other manners and is not limited to the above manner. To make the transmission more stable, the straight shaft must keep the same mounting direction. Other descriptions are similar to the above and will not be repeated herein.

Embodiment 6

Figure 14:
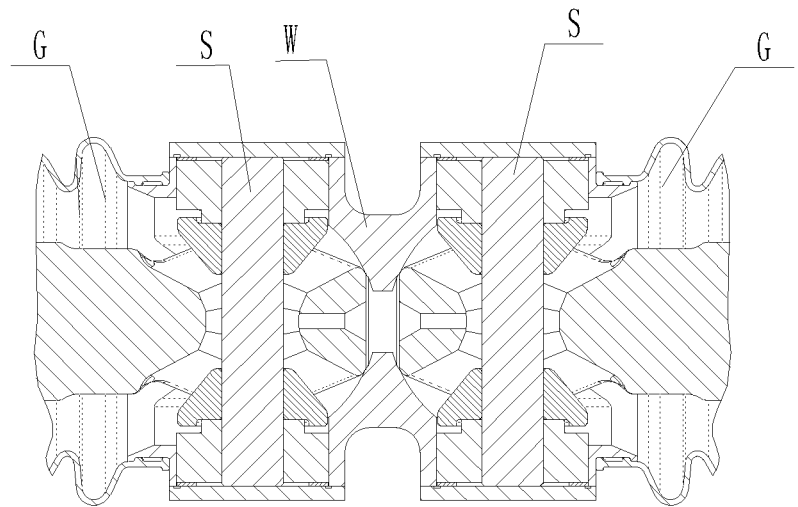
FIG. 14 is a schematic view illustrating that two sockets are integrated oppositely and symmetrically for use.

FIG. 14 is a schematic view illustrating that two back-to-back sockets are integrated for use. Two balls are respectively at two ends of a transmission shaft assembly and are docked with a transmission system through ball handles. Other descriptions are similar to the above and will not be repeated herein.

In the description of the present disclosure, orientations or position relationships indicated by terms such as "front end", "rear end", "left", "right", "upper", "lower", and "horizontal" are shown in the drawings. These terms are merely used to facilitate and simplify the description, rather than to indicate or imply that the mentioned apparatus or elements must have a specific orientation and must be established and operated in a specific orientation. Therefore, these terms should not be understood as a limitation of the present disclosure.

In the description of the present disclosure, it should be noted that, unless otherwise clearly specified and defined, meanings of the terms "arrange", "install", "connected with", "connected to", and "communicate" should be understood in a broad sense. For example, the connection may be a fixed, removable, or integral connection; a mechanical or an electrical connection; may be a direct or an indirect connection by using an intermediate medium; or intercommunication between two components. Those of ordinary skill in the art may deduce specific meanings of the foregoing terms in the present disclosure based on a specific situation.

Certainly, the above-mentioned contents are merely the preferred embodiments of the present disclosure and are not to be construed as limiting the scope of the embodiment of the present disclosure. The present disclosure is not limited to the above-mentioned examples, and equivalent changes, modifications, and the like made by those of ordinary skill in the art within the scope of the present disclosure should all fall within the scope covered by the present disclosure.

What is claimed is:

1. A ball-hinged transmission shaft, comprising:
   a socket,
   a ball, and
   a straight shaft,
   wherein an outer spherical surface of the ball is positioned and limited in an inner positioning spherical surface of the socket to form a sliding fit pair;
   a transmission hole is formed in the ball; after passing through the transmission hole of the ball, the straight shaft is hinged into a bearing hole of the socket through a bearing;
   a rolling element is further coaxially provided on the straight shaft, the rolling element is a rotator with an axis of the straight shaft as a center of rotation, an outside of the rolling element is connected to the bearing;
   a mouth-shaped surface is further provided at two ends of the transmission hole of the ball, the mouth-shaped surface is a curved surface matching a shape of the rolling element, the rolling element is fit and provided in the mouth-shaped surface at the two ends of the transmission hole of the ball; and
   the ball is restricted by the inner positioning spherical surface of the socket, the straight shaft, and the rolling element at the same time.

2. The ball-hinged transmission shaft according to claim 1, wherein an outer surface of the rolling element matching the mouth-shaped surface is a tapered surface, and a contact generatrix between the tapered surface and the mouth-shaped surface is a straight line.

3. The ball-hinged transmission shaft with a straight shaft according to claim 2, wherein an extended line of the contact generatrix passes through a center of the inner spherical surface of the socket.

4. The ball-hinged transmission shaft according to claim 3, wherein the bearing is a tapered roller bearing.

5. The ball-hinged transmission shaft according to claim 3, wherein the bearing is a tapered roller bearing, and the rolling element and an inner ring of the bearing are of an integral structure.

6. The ball-hinged transmission shaft according to claim 2, wherein the bearing is a tapered roller bearing.

7. The ball-hinged transmission shaft according to claim 2, wherein the bearing is a tapered roller bearing, and the rolling element and an inner ring of the bearing are of an integral structure.

8. The ball-hinged transmission shaft according to claim 1, wherein an outer surface of the rolling element matching the mouth-shaped surface is a revolution curved surface, and a contact generatrix between the revolution curved surface and the mouth-shaped surface is a curved line.

9. The ball-hinged transmission shaft according to claim 8, wherein the contact generatrix is an arc, a hyperbolic curve, or an involute.

10. The ball-hinged transmission shaft according to claim 9, wherein the hearing is a tapered roller bearing.

11. The ball-hinged transmission shaft according to claim 9, wherein the bearing is a tapered roller bearing, and the rolling element and an inner ring of the bearing are of an integral structure.

12. The ball-hinged transmission shaft according to claim 8, wherein the bearing is a tapered roller bearing.

13. The ball-hinged transmission shaft according to claim 8, wherein the bearing is a tapered roller bearing, and the rolling element and an inner ring of the bearing are of an integral structure.

14. The ball-hinged transmission shaft according to claim 1, wherein the bearing is a tapered roller bearing.

15. The ball-hinged transmission shaft according to claim 1, wherein the bearing is a tapered roller bearing, and the rolling element and an inner ring of the bearing are of an integral structure.

16. The ball-hinged transmission shaft according to claim 1, wherein the socket is of an integral or split structure.

17. The ball-hinged transmission shaft with a straight shaft according to claim 1, wherein two fit pairs of ball and socket are paired for use, two sockets are respectively arranged at two ends of a transmission shaft assembly, the transmission shaft comprises a spline shaft and a spline housing, and the transmission shaft is stretched and retracted through a cooperation between the spline shaft and the spline housing.

18. The ball-hinged transmission shaft according to claim 1, wherein two sockets are connected oppositely and symmetrically, and integrated for use.

* * * * *